United States Patent [19]

Smeal et al.

[11] Patent Number: 5,393,830
[45] Date of Patent: Feb. 28, 1995

[54] LAMINATING RESINS HAVING LOW ORGANIC EMISSIONS

[75] Inventors: Thomas W. Smeal, Murrysville Boro; George L. Brownell, Mt. Lebanon Township, Allegheny County, both of Pa.

[73] Assignee: Aristech Chemical Corporation, Pittsburgh, Pa.

[21] Appl. No.: 75,432

[22] Filed: Jun. 14, 1993

Related U.S. Application Data

[63] Continuation-in-part of Ser. No. 24,022, Mar. 1, 1993, abandoned.

[51] Int. Cl.$^6$ ............................................. C08L 67/06
[52] U.S. Cl. ......................................... 525/44; 525/48
[58] Field of Search ..................................... 525/44, 48

[56] References Cited

U.S. PATENT DOCUMENTS

| | | | |
|---|---|---|---|
| 4,029,848 | 6/1977 | Nelson | 428/430 |
| 4,148,765 | 4/1979 | Nelson | 260/22 CB |
| 4,233,432 | 11/1980 | Curtis, Jr. | 528/298 |
| 4,246,367 | 1/1981 | Curtis, Jr. | 525/49 |
| 4,289,684 | 9/1981 | Kallaur | 260/40 R |
| 4,327,013 | 4/1982 | Peters | 524/538 |
| 4,465,806 | 8/1984 | Lee | 525/31 |
| 4,585,833 | 4/1986 | Domeier | 525/260 |
| 4,755,575 | 7/1988 | Domeier et al. | 526/313 |
| 4,808,638 | 2/1989 | Steinkraus et al. | 522/24 |
| 5,202,366 | 4/1993 | Reid et al. | 523/516 |

FOREIGN PATENT DOCUMENTS 0234692   9/1987   European Pat. Off. .

OTHER PUBLICATIONS

Sartomer Company, Product Bulletin.

*Primary Examiner*—Patricia A. Short
*Attorney, Agent, or Firm*—William L. Krayer

[57] ABSTRACT

A laminating resin is made from (1) an unsaturated polyester resin comprising maleic acid, phthalic acid, and glycol(s), and dicyclopentadiene, (2) a diacrylate or dimethacrylate of alkoxylated bisphenol-A, and (3) EG dimethacrylate. The resin requires no styrene or other monomer, although up to 20% vinyl toluene or 40% cyclohexyl methacrylate may be used to adjust viscosity.

4 Claims, No Drawings

LAMINATING RESINS HAVING LOW ORGANIC EMISSIONS

RELATED APPLICATION

This is a continuation-in-part of our application Ser. No. 024,022, filed Mar. 1, 1993, now abandoned.

TECHNICAL FIELD

This invention relates to resin compositions which cure as they are shaped, laminated, brushed, sprayed or otherwise placed into the space where they are to form a product; such resins are broadly known as laminating resins, commonly have an unsaturated polyester resin base, and nearly always are employed in a solution of an organic monomer such as styrene. The organic monomer is intended to copolymerize with the resin but typically and notoriously may also tend to volatilize in significant amounts into the workplace environment. The present invention is a composition which can be used in existing equipment, procedures, and workplaces, but which will emit far less monomer than the typical laminating resin heretofore.

BACKGROUND OF THE INVENTION

Many attempts have been made to devise laminating resins having low volatile emissions and still meet the physical specifications and other desirable properties of the end products, while remaining relatively easy to use. In Lee U.S. Pat. No. 4,465,806, for example, a more or less conventional unsaturated polyester resin is combined with, instead of the usual styrene, a reaction product of a polyepoxy compound and acrylic or methacrylic acid which may be the diacrylate of a polyglycidyl ether of bisphenol-A. These compounds are made from epoxy compounds, and the author of U.S. Pat. No. 4,465,806 requires that a significant portion of the epoxy groups be unreacted for use in their resin. Moreover, unlike the present invention, they form pendant OH groups.

Ethoxylated, difunctional, bisphenol-A has been used in the past as an ingredient in various types of resins, generally resins which include a significant diisocyanate component, as in Ford, Jr. et al U.S. Pat. No. 3,876,726.

However, we are not aware of any combinations in the prior art of the types of laminating resins we employ in our invention, namely combinations of ethoxylated difunctional bisphenol-A and unsaturated polyester resins.

SUMMARY OF THE INVENTION

Our new laminating resin comprises two major components. The first is a base resin comprising glycols and unsaturated dicarboxylic acids; optionally the base resin may also contain a saturated dicarboxylic acid. In polymeric form, they are typically maleic and phthalic acid residues, with optional isophthalic residues, interspersed with glycol residues. These glycols are commonly ethylene glycol, diethylene glycol, propylene glycol and dipropylene glycol, usually as mixtures, but many other glycols can be utilized; dicyclopentadiene may be included as well, as is known in the art. The second component is a diacrylate or dimethacrylate of alkoxylated bisphenol-A of the formula

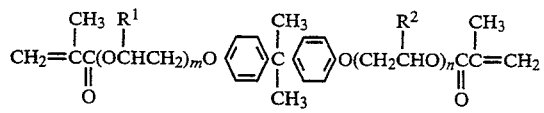

where m and n are independently numbers from 1 to about 10, and $R^1$ and $R^2$ are independently, in each alkoxy group, hydrogen or $CH_3$. These two major ingredients may be present in weight ratios of about 1.3:1 to about 0.7:1. The composition may also include up to about 30% based on the total of the major ingredients of an additional dimethacrylate crosslinking material such as ethylene glycol dimethacrylate, up to about 20% vinyl toluene for viscosity adjustment and for its contribution as a monomer, and up to about 70% cyclohexyl methacrylate, also as an additional monomer and for its utility in viscosity adjustment. Since our objective is to design a composition which works very well as a laminating resin without significant styrene emissions, the addition of styrene to the recipe defeats that purpose and is not recommended, but the composition will continue to be operable as an excellent laminating resin even though some styrene—say, up to about 10%, is included. The composition will also tolerate many other minor ingredients known to be useful in the unsaturated polyester and laminating art.

DETAILED DESCRIPTION OF THE INVENTION

While the problem at hand is to create a formulation which drastically differs from commercial standard laminating resins in terms of volatile emissions during application, the market dictates that it must be accomplished without significantly altering the widely used equipment and techniques of application. Accordingly, the following criteria are to be kept in mind at all times:

1. Reduced emission of volatile organic compounds—regulations will become more stringent with time.
2. Less potential hazard to human health and the environment—regulations will also become more stringent with time.
3. Minimal increase in cost when commercialized, and reason to believe cost will be reduced in the long run.
4. Compatibility between components of the resin system.
5. Reactivity that is similar to that of styrenated polyester resins.
6. Viscosity that is similar to that of styrenated polyester resins—100 to 300 cps.
7. Physical properties similar to or better than those of styrenated polyester resin.
8. Ability to wet glass and bond to other components of an assembly.

Persons skilled in the art will realize that number 7, relating to physical properties of the final product, can by itself include several important specifications. Thus, the problem is not simply one of finding a monomer which is not as volatile or objectionable as styrene. Rather, many criteria have to be balanced, and, with thousands of chemicals to consider, analysis of the combinations and their effects is extremely difficult. One must decide on the important functions and properties, settle on a systematic but simple screening process, and try to develop a short list of prospective formulations which have a good chance of meeting all the criteria within a practical time period.

The proliferation of input variables to attain these objectives may be further appreciated by considering the more or less conventional unsaturated polyester compositions which may be used as a base. They are prepared by polycondensation of polycarboxylic acid derivatives, one of which must be an alpha, beta-ethylenically unsaturated polycarboxylic acid, and polyols. By polycarboxylic acid derivatives we mean to include polycarboxylic acids, their esters of lower alcohols, their acid chlorides and their anhydrides.

The ratio of polycarboxylic acid to polyol is usually a 1:1 molar ratio. However, in most esterification processes, a slight excess of polyol is utilized to compensate for polyol losses during esterification. Also, although dicarboxylic acids and diols are most frequently utilized and the 1:1 molar ratio is prevalent, the utilization of triols and the like requires the ratio of acid to polyol to be stated more precisely as one equivalent of acid per equivalent of polyol.

The unsaturated polyesters useful in this invention may be prepared from an acid mixture wherein the unsaturated polycarboxylic acid comprises as little as 20 mole percent of the total acids present, although it is generally preferred that the unsaturated polycarboxylic acid comprises about 30% or more of the total acid content.

Some of the unsaturated polycarboxylic acids useful in preparing unsaturated polyesters used in this invention include:

| | |
|---|---|
| Maleic acid | Citraconic acid |
| Fumaric acid | Glutaconic acid |
| Itaconic acid | Chloromaleic acid |
| Mesaconic acid | | and the like, wherein the term "acid" is used to include the corresponding anhydrides where such anhydrides exist.

Some of the saturated and aromatically unsaturated polycarboxylic acids optionally useful in preparing unsaturated polyesters used in this invention include:

| | |
|---|---|
| Phthalic acid | Isophthalic acid |
| Tetrahydrophthalic acid | Hexahydrophthalic acid |
| Endomethylene tetrahydrophthalic acid | Glutaric acid |
| | Suberic acid |
| Tetrachlorophthalic acid | Sebacic acid |
| Hexachloroendomethylene tetrahydrophthalic acid | |
| Succinic acid | |
| Adipic acid | | and the like, wherein the term "acid" includes the corresponding anhydrides where such anhydrides exist. The >C=C< groups of the aromatic unsaturated polycarboxylic acids are relatively unreactive and do not participate to any substantial degree in polymerization reactions occurring between the unsaturation group of the polyester, as provided by the alpha, beta-ethylenically unsaturated acid present, such as maleic acid, and the ethylenically unsaturated monomer, such as styrene as described elsewhere herein.

Polyols useful in preparing polyesters for use in this invention are polyfunctional alcohols of the type conventionally utilized in polyester preparation. Such polyols include:

| | |
|---|---|
| Ethylene glycol | 1,5 propanediol |
| Propylene glycol | Triethylene glycol |
| Butylene glycol | Glycerol |
| Diethylene glycol | 1,4,6-hexanetriol |
| Trimethylolpropane | Trimethylolethane |
| Dipropylene glycol | Pentaerythritol |
| Neopentyl glycol | |
| Alkoxylated 2,2-bis(4-hydroxyphenyl) propane | | and the like. Although diols are generally preferred in the preparation of unsaturated polyesters, the more functional polyols, i.e. polyols having a functionality of about four, are frequently used.

In addition, dicyclopentadiene may be included and may be considered a normal part of the "base resin" as used herein.

Liquid resin properties measured in the experiments reported below were gel time, (reported in the tables herein in minutes and seconds, as 13:17, for example), room temperature interval time, which is the time between gelation and the exothermic peak, room temperature exothermic peak which is the highest temperature reached in a 100 g mass of resin during the curing process, Brookfield viscosity, and Barcol hardness by ASTM D2583. For volatile emissions, we followed the Rule 1162 Standard Method for Static Volatile Emissions of the South Coast Air Quality Management District (California). This test is designed for the determination of volatile emissions of polyester and vinyl ester resins as received from the manufacturer, and allows fabricators using polyester and vinyl ester resins to monitor volatile emissions (principally styrene monomer) from resins used in the fabrication process. The results are to be reported as volatile losses in grams per square meter.

The test requirements are as follows: An environment at 77° C. and 50% relative humidity is maintained. If a controlled environment is not available, conditions should be reported for which measurements are made. A 200 gm pre-promoted resin is weighed out into a suitable dry and clean container. The container is covered and placed in a 25° C. temperature bath. A balance is placed in a draft free enclosure. A gallon lid is cleaned with solvent and wiped dry. The diameter is measured to the nearest 0.1 cm. The gallon lid is placed on an inverted paper or plastic cup mounted on the balance pan. A bent paper clip is positioned in the center of the gallon lid. This weight (TARE WEIGHT) is recorded. The container is taken from the temperature bath and an appropriate volumetric or weight measure of catalyst is added. A timer is started at this point. The catalyst is mixed with the resin for one minute. The INITIAL WEIGHT is determined by pouring 100.0±0.5 gm of catalyzed resin into the can lid and recording the weight. Next, the paper clip is used to determine when the resin has hardened sufficiently to allow the resin or lid to be lifted. The time (gel time) is recorded at this point. The resin is then allowed to harden in the can lid and every 15 minutes it is reweighed until concurrent weights agree to within 0.05 gm. This is recorded as the FINAL WEIGHT. The entire procedure should be repeated until duplicate samples agree to the nearest 5 gm/m$^2$.

The volatile emissions per square meter are calculated as follows:

$$\text{Volatile Losses per Square Meter} = \frac{\text{INITIAL WEIGHT} - \text{FINAL WEIGHT}}{\text{Area of Sample in Square Meters}}.$$

The clear castings tests adopted were as follows:
1. Tensile strength—ASTM D638.
2. Tensile modulus—ASTM D638.
3. Elongation—ASTM D638.
4. Flexural strength—ASTM D790.
5. Flexural modulus—ASTM D790.
6. Heat deflection temperature—ASTM D648.
7. Water absorption at 150° F.—ASTM D570 (modified).

The water absorption test was modified as follows: the temperature was set as 150° F. and long term immersion was set as one week. In the data reported in Table I, Resin A is: a polyester resin composed of 1.0 mole maleic anhydride, 2.0 moles phthalic anhydride, 0.42 mole diethylene glycol and 2.71 moles propylene glycol. Resin B is similar to Resin A with a lower viscosity. Sartomer CD480 is ethoxylated bisphenol-A dimethacrylate where m and n in the above formula, are each 10. Sartomer 348 is ethoxylated bisphenol-A dimethacrylate where m and n in the above formula are both 1. Mod L is 25% hydroquinone and 75% propylene glycol.

From the data in Table I, it can be seen that formulation Z has better than acceptable resin properties and clear casting properties, and has volatile emissions of about one-fifth the rate of the more or less classical commercial resin A2.

As suggested near the tops of pages 3 and 8 of this application, dicyclopentadiene may be considered a normal ingredient of the unsaturated polyester portion of our composition. Unsaturated polyester compositions which contain dicyclopentadiene are well known and may be exemplified by those disclosed by Curtis in U.S. Pat. Nos. 4,233,432 and 4,246,367 and Nelson in U.S. Pat. Nos. 4,029,848 and 4,148,765; the entire disclosures of all four of these patents are included herein by reference. Generally speaking, the base polyesters we use in this invention include all the base polyesters previously described herein in which up to about 60 weight percent dicyclopentadiene ("DCPD") is included. Where DCPD is included, about 20 to about 52.5 is preferred, but about 1% to about 55% by weight may be used with good effect. The following Table II shows results of tests where such formulations have been used as the base polyester with the other ingredients of our invention.

In Table II, the Resin C contains about 52.5 weight percent DCPD and is otherwise similar to Resin A. It may be seen that the formulation of the present invention designated as C-2 performs very well, having excellent marks for tensile strength, flexural strength and other physical properties while maintaining very low emissions and good working properties—compare the viscosities of the formulations, for example. The emissions test designated 1162 refers to the California South Coast Air Quality Management District Rule 1162 Standard Method for Static Volatile Emissions. The emissions test expressed in min:sec represents the time interval during which emissions occurred. These materials were cured with 0.30 Co (12%), 0.20 potassium (16%), 0.30 N,N-dimethylacetoacetamide (EASTMAN DMAA) and 1.50% Hi Point 90.

TABLE I

| RESIN | A2 | C2 | S | Z | A1 | O |
|---|---|---|---|---|---|---|
| Resin A | 60.00 | 60.00 | 40.00 | 35.00 | 35.00 | — |
| Resin B | — | — | — | — | — | 45.00 |
| Sartomer CD480 | — | — | 15.00 | 15.00 | 15.00 | 10.00 |
| Sartomer 348 | — | — | 20.00 | 20.00 | 20.00 | 15.00 |
| EG Dimethacrylate | — | — | 25.00 | 10.00 | 20.00 | 30.00 |
| Vinyl Toluene | — | 40.00 | — | 10.00 | — | — |
| Cyclohexyl Methacrylate | — | — | — | 10.00 | — | — |
| Divinyl Benzene | — | — | — | — | 10.00 | — |
| Styrene | 40.00 | — | — | — | — | — |
| Mod L | 0.20 | 0.22 | 0.06 | 0.12 | 0.12 | 0.06 |
| RESIN PROPERTIES | | | | | | |
| Gel time, min:sec | 12:59 | 13:17 | 21:18 | 18:29 | 11:30 | 5:20 |
| Interval, min:sec | 5:58 | 6:54 | 4:32 | 4:11 | 3:26 | 3:19 |
| Exotherm peak, °F. | 345 | 324 | 249 | 276 | 294 | 245 |
| Viscosity, cps, 75° F. | 315 | 340 | 1,390 | 426 | 624 | 396 |
| 1162 Emissions, G/M2 | 31.5 | 20.6E | 3.6 | 6.1 | 9.7 | 3.6 |
| Barcol hardness | | | | | | |
| 45 minutes | 45 | 42 | 47 | 44 | 52 | 34 |
| One hour | 45 | 43 | 50 | 48 | 53 | 36 |
| 24 hours | 49 | 49 | 52 | 51 | 54 | 36 |
| CLEAR CASTING PROPERTIES | | | | | | |
| Tensile strength, psi | 9,308 | 7,555 | 8,069 | 9,635 | 8,176 | 10,179 |
| Ten. modulus, 10-5 psi | 0.549 | 0.534 | 0.466 | 0.565 | 0.575 | 0.567 |
| Elongation, % | 1.9 | 1.6 | 3.2 | 2.7 | 1.9 | 2.3 |
| Flexural strength, psi | 16,008 | 15,317 | 10,475 | 16,889 | 15,780 | 16,013 |
| Flex modulus, 10-5 psi | 0.586 | 0.573 | 0.322 | 0.444 | 0.482 | 0.498 |
| Heat deflect. temp, °F. | 144 | 138 | 169 | 142 | 147 | 141 |
| Water absorption, % at 150° F. | | | | | | |
| One day | 0.89 | 0.91 | 1.01 | 1.19 | 1.26 | 1.43 |
| 7 days | 1.89 | 1.89 | 2.12 | 1.65 | 1.76 | 2.14A |

E - This value was estimated based on the difference in results caused by using different end points for the 1162 test.
A - The surfaces of the test specimens were alligatored. This indicates a more severe problem than the weight gain indicates.

TABLE II

| Low VOC Laminating Resins Based on a DCPD Polyester Polymer | | | | | | | |
|---|---|---|---|---|---|---|---|
| Resin | J-1 | K-1 | L-1 | N-1 | A-2 | B-2 | C-2 |
| Composition | | | | | | | |
| Resin C | 40.00 | 35.00 | 35.00 | 35.00 | 35.00 | 35.00 | 30.00 |
| Sartomer S480 | 15.00 | 20.00 | 15.00 | 15.00 | 25.00 | 25.00 | 20.00 |
| Sartomer S348 | 20.00 | 20.00 | 15.00 | 20.00 | 10.00 | 10.00 | 15.00 |
| EG Dimethacrylate | 25.00 | 25.00 | 35.00 | 20.00 | 10.00 | 5.00 | 15.00 |
| Cyclohexyl Meth. | — | — | — | — | 20.00 | 25.00 | 20.00 |
| Vinyl Toluene | — | — | — | 10.00 | — | — | — |
| Mod L | 00.06 | 00.06 | 00.06 | 00.12 | 00.15 | 00.15 | 00.15 |
| Resin Properties | | | | | | | |
| Gel Time, min:sec | 12:19 | 12:58 | 09:45 | 17:25 | 20:48 | 33:23 | 21:10 |
| Interval, min:sec | 03:37 | 03:47 | 04:05 | 04:00 | 05:40 | 08:52 | 06:30 |
| Exotherm, °F. | 259 | 262 | 285 | 286 | 243 | 233 | 265 |
| Viscosity, cps @ 75° F. | 1,138 | 620 | 390 | 440 | 436 | 418 | 216 |
| Barcol | | | | | | | |
| 45 minutes | 52.1 | 49.9 | 51.0 | 49.3 | 41.0 | 29.8 | 42.7 |
| one hour | 51.8 | 50.6 | 51.4 | 50.3 | 40.9 | 37.6 | 45.9 |
| two hours | 52.2 | 51.1 | 52.1 | 51.0 | 41.8 | 38.5 | 47.3 |
| three hours | 52.3 | 51.0 | 52.2 | 51.0 | 42.0 | 39.0 | 47.3 |
| four hours | 52.2 | 51.4 | 52.3 | 51.2 | 40.7 | 39.0 | 47.4 |
| 24 hours | 53.8 | 52.3 | 52.7 | 51.6 | 45.6 | 41.8 | — |
| 1162 Emissions, G/M2 | 11.5 | 04.2 | 04.2 | 11.5 | 04.8 | 02.4 | 04.8 |
| Emissions, min:sec | 20:40 | 28.01 | 09.01 | 20:12 | 49:37 | 35:10 | 50:35 |
| Properties of a Clear Casting | | | | | | | |
| HDT, °F. | 200 | 205 | 241 | 208 | 146 | 138 | 168 |
| Tensile Str., psi | 4,173 | 5,034 | 4,269 | 7,018 | 9,574 | 9,818 | 9,317 |
| Ten Mod., 10-5 psi | 0.527 | 0.521 | 0.551 | 0.515 | 0.426 | 0.402 | 0.458 |
| Elongation, % | 0.9 | 1.1 | 0.8 | 1.6 | 3.3 | 4.6 | 2.6 |
| Flexural Str., psi | 10,162 | 11,753 | 11,219 | 12,669 | 15,189 | 15,700 | 15,590 |
| Flex Mod., 10-5 psi | 0.529 | 0.508 | 0.541 | 0.491 | 0.571 | 0.618 | 0.517 |
| Water Absorption @ 150° F. | | | | | | | |
| 24 hours | 0.94 | 1.05 | 0.94 | 0.88 | 1.11 | 1.14 | 0.98 |
| seven days | 1.65 | 1.74 | 1.72 | 1.44 | 1.90 | 1.89 | 1.64 |

Where vinyl toluene is used, we prefer the formulation to contain about 5% to about 15%; not more than about 20% should be used, to minimize emissions.

Our invention therefore may be restated as a laminating resin composition comprising (A) a base resin comprising about 10% to about 50% by weight glycols, about 20% to about 50% unsaturated polycarboxylic acids or derivatives thereof, including up to about 30% saturated dicarboxylic acids, and about 1% to about 60% dicyclopentadiene, (B) alkoxylated bisphenol-A dimethacrylate having at least two alkoxy groups, in a weight ratio of (A) to (B) of about 1.3:1 to about 0.7:1, (C) up to about 30% by weight ethylene glycol dimethacrylate, (D) up to about 20% by weight vinyl toluene, and (E) up to about 40% by weight cyclohexyl methacrylate.

As indicated above, the vinyl toluene and cyclohexyl methacrylate need not be used at all. Accordingly, our invention includes a composition comprising simply the base polyester polymer and the alkoxylated bisphenol-A dimethacrylate. The EG dimethacrylate may optionally be added. The ethoxylated bisphenol-A dimethacrylates have totals of 2 and 10 ethoxy groups arranged more or less evenly on each side of the bisphenol-A; however, we may employ a single compound or compounds having any variation of combinations of ethoxy or propoxy groups from two to about 20 groups.

We claim:

1. A laminating resin composition consisting essentially of (A) a base resin comprising about 10% to about 50% by weight glycols, about 20% to about 50% by weight unsaturated polycarboxylic acids or derivatives thereof, including up to about 30% saturated dicarboxylic acids, and about 1% to about 60% dicyclopentadiene, (B) alkoxylated bisphenol-A dimethacrylate having at least two alkoxy groups, in a weight ratio of (A) to (B) of about 1.3:1 to about 0.7:1, (C) up to about 30% by weight ethylene glycol dimethacrylate, (D) up to about 20% by weight vinyl toluene, and (E) up to about 40% by weight cyclohexyl methacrylate, said composition emitting no more than about 12 grams of volatiles per square meter when tested according to the Rule 1162 Standard Method for Static Volatile Emissions of the South Coast (California) Air Quality Management District.

2. A laminating resin of claim 1 wherein the weight ratio of (A) to (B) is about 1:1.

3. A laminating resin of claim 1 wherein about 19% to about 71% by weight of the alkoxylated bisphenol-A dimethacrylate is ethylene oxide groups.

4. Resin composition of claim 1 wherein the base resin (A) includes about 20% to about 55% by weight dicyclopentadiene.

* * * * *